(12) United States Patent
Morishita et al.

(10) Patent No.: US 12,176,554 B2
(45) Date of Patent: Dec. 24, 2024

(54) POWER STORAGE DEVICE AND METHOD OF MANUFACTURING SAME

(71) Applicant: PRIME PLANET ENERGY & SOLUTIONS, INC., Tokyo (JP)

(72) Inventors: Taijyu Morishita, Kasai (JP); Wataru Okada, Kobe (JP)

(73) Assignee: Prime Planet Energy & Solutions, Inc., Tokyo (JP)

( * ) Notice: Subject to any disclaimer, the term of this patent is extended or adjusted under 35 U.S.C. 154(b) by 588 days.

(21) Appl. No.: 17/403,279

(22) Filed: Aug. 16, 2021

(65) Prior Publication Data

US 2022/0069398 A1 Mar. 3, 2022

(30) Foreign Application Priority Data

Aug. 25, 2020 (JP) .................. 2020-141757

(51) Int. Cl.
| | |
|---|---|
| *H01M 50/202* | (2021.01) |
| *H01M 10/02* | (2006.01) |
| *H01M 10/04* | (2006.01) |
| *H01M 10/613* | (2014.01) |
| *H01M 50/147* | (2021.01) |

(Continued)

(52) U.S. Cl.
CPC ......... *H01M 50/202* (2021.01); *H01M 10/02* (2013.01); *H01M 10/0486* (2013.01); *H01M 10/613* (2015.04); *H01M 50/147* (2021.01); *H01M 50/224* (2021.01); *H01M 50/543* (2021.01)

(58) Field of Classification Search
CPC ............. H01M 50/202; H01M 50/543; H01M 50/224; H01M 50/147; H01M 10/613; H01M 10/02; H01M 10/0486

USPC .......................................................... 429/99
See application file for complete search history.

(56) References Cited

U.S. PATENT DOCUMENTS

| | | |
|---|---|---|
| 2012/0028094 A1 | 2/2012 | Kim et al. |
| 2012/0045686 A1 | 2/2012 | Jung |

(Continued)

FOREIGN PATENT DOCUMENTS

| | | |
|---|---|---|
| CN | 206422117 U | 8/2017 |
| CN | 111052494 A | 4/2020 |

(Continued)

OTHER PUBLICATIONS

"Mechanical Basis and Structural Design", Tang Jianbing, Chongqing University Press, Feb. 28, 2016, pp. 375-376.

(Continued)

*Primary Examiner* — James M Erwin
(74) *Attorney, Agent, or Firm* — Finnegan, Henderson, Farabow, Garrett, and Dunner, LLP

(57) ABSTRACT

A power storage device includes: a power storage module in which a plurality of power storage cells are stacked along a stacking direction; and a case that accommodates the power storage module, wherein each of the power storage cells in the power storage module has a main surface extending in a direction substantially orthogonal to the stacking direction, and the case includes a supporting portion that supports, along the stacking direction, the power storage module accommodated in the case, and the case is provided with a recess that is provided at a position different from the supporting portion and that opens toward the main surface.

8 Claims, 7 Drawing Sheets

(51) Int. Cl.
  *H01M 50/224* (2021.01)
  *H01M 50/543* (2021.01)

(56) References Cited

U.S. PATENT DOCUMENTS

| | | | |
|---|---|---|---|
| 2014/0023906 A1 | 1/2014 | Hashimoto et al. | |
| 2015/0104693 A1 | 4/2015 | Dorsch | |
| 2017/0069888 A1* | 3/2017 | Uchida | H01M 10/625 |
| 2017/0110695 A1* | 4/2017 | Nishikawa | H01M 50/233 |
| 2017/0365897 A1 | 12/2017 | Okada et al. | |
| 2018/0019454 A1 | 1/2018 | Okada et al. | |
| 2019/0273232 A1 | 9/2019 | Fu et al. | |
| 2019/0379018 A1* | 12/2019 | Varatharajah | H01M 4/73 |
| 2020/0028130 A1* | 1/2020 | Marutani | H01M 10/48 |

FOREIGN PATENT DOCUMENTS

| | | |
|---|---|---|
| EP | 2 421 069 A1 | 2/2012 |
| JP | 2012-28321 A | 2/2012 |
| JP | 2012-094313 A | 5/2012 |
| JP | 5183172 B | 4/2013 |
| JP | 5535520 B | 7/2014 |
| JP | 2014-165004 A | 9/2014 |
| JP | 2014-216189 A | 11/2014 |
| JP | 2015-520480 A | 7/2015 |
| JP | 6400838 B | 10/2018 |
| JP | 6449438 B | 1/2019 |
| JP | 2019-075226 A | 5/2019 |
| JP | 2020-077482 A | 5/2020 |
| JP | 2020-087704 A | 6/2020 |
| WO | WO 2012/133708 A1 | 10/2012 |
| WO | WO 2019/151037 A1 | 8/2019 |

OTHER PUBLICATIONS

Office action in application No. CN 202110946284.3, dated May 18, 2024.

* cited by examiner

POWER STORAGE DEVICE AND METHOD OF MANUFACTURING SAME

This nonprovisional application is based on Japanese Patent Application No. 2020-141757 filed on Aug. 25, 2020, with the Japan Patent Office, the entire contents of which are hereby incorporated by reference.

BACKGROUND OF THE INVENTION

Field of the Invention

The present disclosure relates to a power storage device and a method of manufacturing the power storage device.

Description of the Background Art

Conventionally, various cooling methods for power supply devices has been known. Each of PTL 1 (Japanese Patent No. 5535520), PTL 2 (Japanese Patent No. 6400838), and PTL 3 (Japanese Patent No. 6449438) discloses an air-cooling type battery. Each of PTL 4 (Japanese Patent No. 5183172), PTL 5 (WO 2012/133708), and PTL 6 (Japanese Patent Laying-Open No 2012-28321) discloses a water-cooling type battery.

PTL 7 (Japanese National Patent Publication No. 2015-520480) discloses that an elastoplastic member is disposed between two cells of a battery module and the resulting stack is accommodated in a case with the stack being pressed.

Further reduction in weight and size of a power storage device such as a battery have been required. On the other hand, it has been also required to stably hold a plurality of power storage cells.

The structures described in PTL 1 to PTL 7 are not necessarily sufficient to satisfy the above two requirements.

SUMMARY OF THE INVENTION

An object of the present disclosure is to provide a power storage device and a method of manufacturing the power storage device, so as to attain reduction in weight and size while stably holding a power storage cell.

A power storage device according to the present disclosure includes: a power storage module in which a plurality of power storage cells are stacked along a stacking direction; and a case that accommodates the power storage module, wherein each of the power storage cells in the power storage module has a main surface extending in a direction substantially orthogonal to the stacking direction, and the case includes a supporting portion that supports, along the stacking direction, the power storage module accommodated in the case, and the case is provided with a recess that is provided at a position different from the supporting portion and that opens toward the main surface.

A method of manufacturing a power storage device according to the present disclosure includes: forming a power storage module by stacking a plurality of power storage cells along a stacking direction; sandwiching, using a jig, the power storage module in the stacking direction; inserting the jig and the power storage module into a case with the power storage module being sandwiched by the jig; and supporting the power storage module by the case along the stacking direction, wherein the inserting of the jig and the power storage module into the case includes inserting the jig into a recess provided in the case, and the supporting of the power storage module by the case includes restraining the power storage module by a supporting portion provided at a position different from the recess in the case.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present disclosure will be described. In the embodiments described below, when reference is made to number, amount, and the like, the scope of the present disclosure is not necessarily limited to the number, amount, and the like unless otherwise stated particularly. Further, in the embodiments described below, each component is not necessarily essential to the present disclosure unless otherwise stated particularly.

Figure 1:
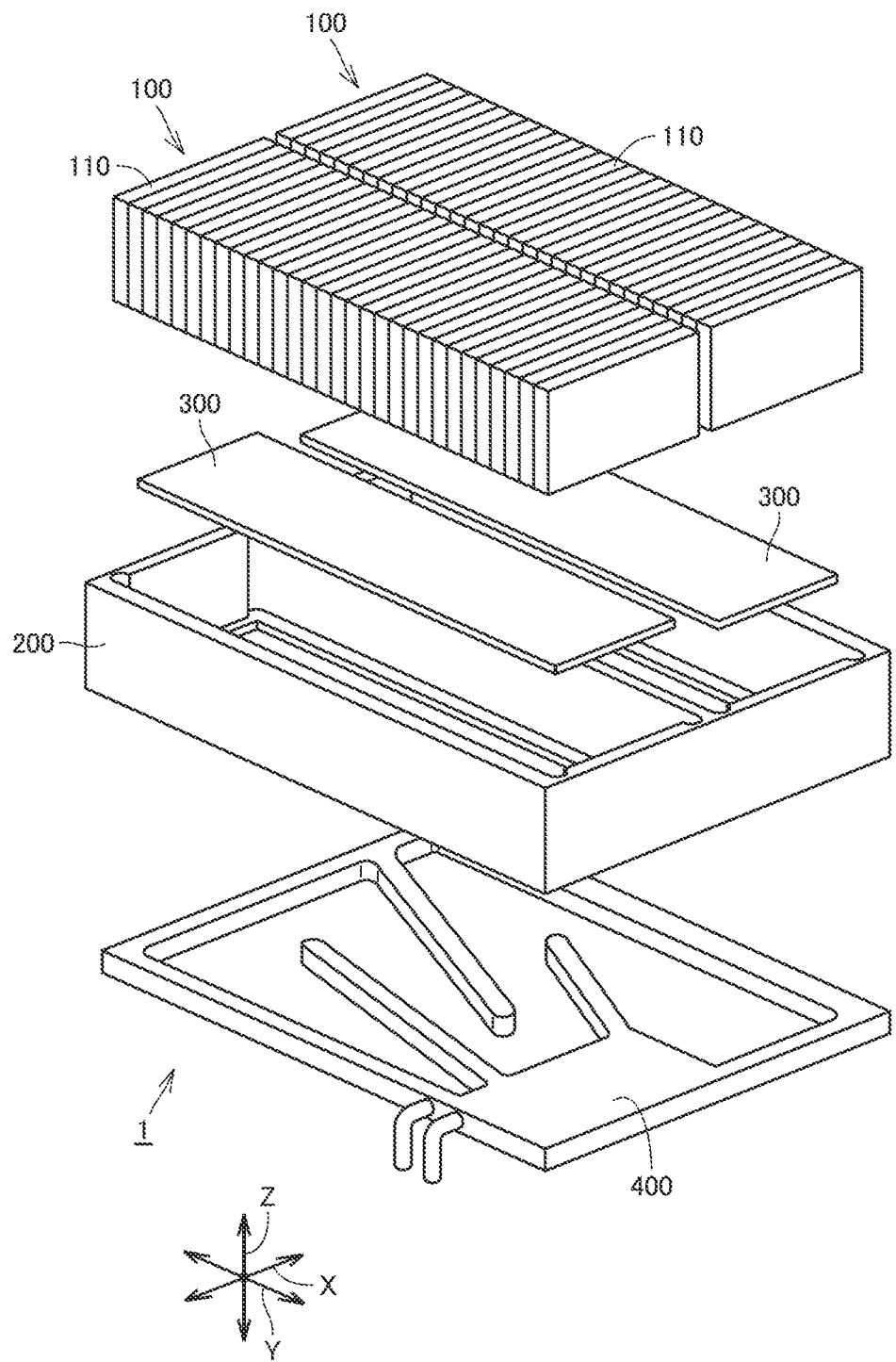
FIG. 1 is an exploded perspective view showing a configuration of a battery pack.

FIG. 1 is an exploded perspective view showing a configuration of a battery pack 1. Battery pack 1 includes battery modules 100, a case 200, heat conducting members 300, and a cooling mechanism 400.

Each of battery modules 100 (power storage modules) includes a plurality of battery cells 110 (power storage cells) stacked along a Y axis direction (stacking direction).

Case 200 accommodates battery module 100. Case 200 may be a casted part (die cast material) composed of a metal material such as aluminum or magnesium, or may be a press-molded part composed of a carbon-containing material. Case 200 is not limited to the above configuration, and may be any case as long as predetermined characteristics such as strength, heat radiation, and thermal conductivity are satisfied. For example, in some cases, case 200 may be composed of a resin.

Each of heat conducting members 300 is provided between battery module 100 and case 200, and promotes transfer of heat generated in battery module 100 to case 200.

Cooling mechanism 400 (heat radiation promoting mechanism) promotes heat radiation from case 200. As an example, cooling mechanism 400 is a water-cooling type cooling unit including a flow path through which coolant is to flow; however, the heat radiation promoting mechanism is not limited to such a water-cooling type cooling device, and a forced air cooling type heat radiation promoting mechanism or a natural heat radiation type heat radiation promoting mechanism (such as a heat radiation fin) may be used, for example.

Figure 2:
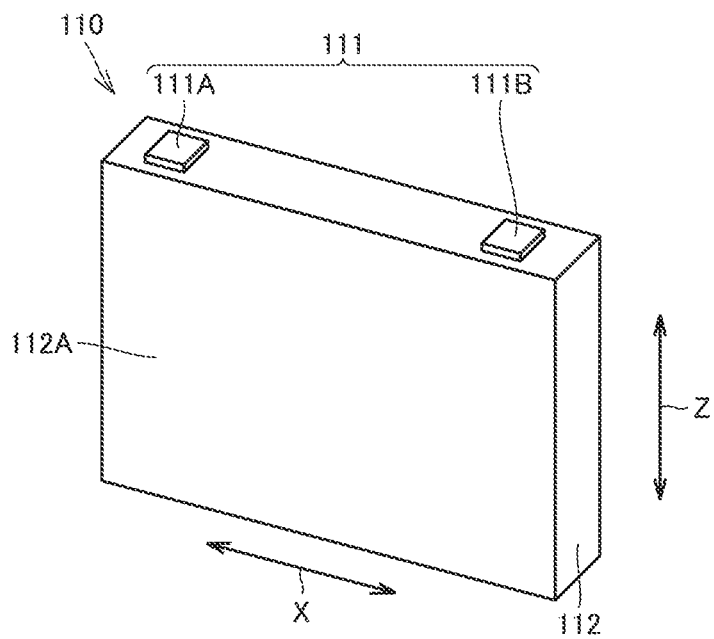
FIG. 2 is a diagram showing a battery cell included in a battery module.

FIG. 2 is a diagram showing battery cell 110 included in battery module 100. As shown in FIG. 2, battery cell 110 includes an electrode terminal 111 and an accommodation case 112. Electrode terminal 111 includes a positive electrode terminal 111A and a negative electrode terminal 111B. Electrode terminal 111 is formed on accommodation case 112. An electrode assembly and an electrolyte solution (not shown) are accommodated in accommodation case 112.

Accommodation case 112 is formed to have a flat rectangular parallelepiped shape. Accommodation case 112 has a main surface 112A extending along an X-Z plane orthogonal to the Y axis direction. That is, battery cell 110 is a prismatic cell.

As an example, battery cell 110 is a lithium ion battery. Battery cell 110 may be another battery such as a nickel-metal hydride battery. Further, in the present disclosure, the "power storage module" is not limited to battery module 100, and a capacitor may be used as the "power storage cell" instead of battery cell 110, for example.

Figure 3:
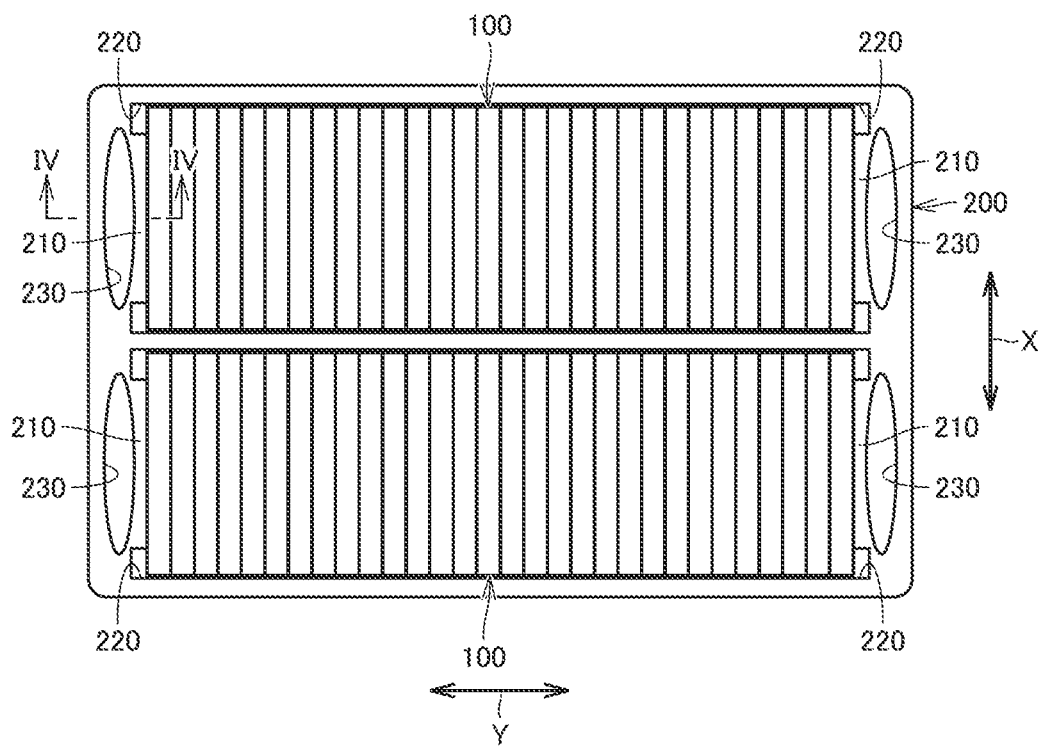
FIG. 3 is a diagram showing a structure of a case in the battery pack according to one embodiment.
Figure 4:
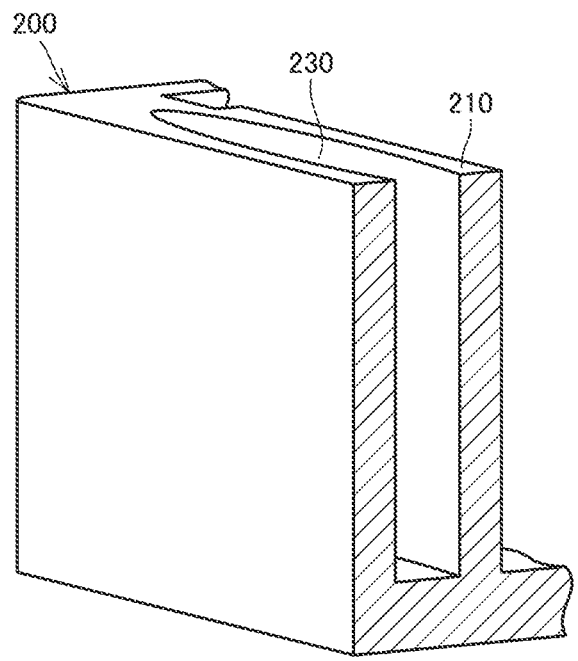
FIG. 4 is a perspective view including a cross section taken along IV-IV in FIG. 3.

FIG. 3 is a diagram showing a structure of case 200 in battery pack 1. FIG. 4 is a perspective view including a cross section taken along IV-IV in FIG. 3. It should be noted that in FIG. 4, battery module 100 is not shown.

As shown in FIGS. 3 and 4, case 200 includes supporting portions 210, and is provided with recesses 220 and cavities 230.

Supporting portions 210 are in direct abutment with main surfaces 112A of battery cells 110 located at both end portions of battery module 100 in the Y axis direction, and support battery module 100 along the Y axis direction. Each of supporting portions 210 is formed at a position facing a central region of battery cell 110 in an X axis direction (width direction).

Recesses 220 are provided at positions adjacent to supporting portions 210 in the X axis direction. Recesses 220 are formed at positions facing both end portions of battery cell 110 in the X axis direction. Each of recesses 220 opens toward main surface 112A. It should be noted that the positions of recesses 220 are not limited to those shown in FIG. 3. Further, the shape of each recess 220 can be changed appropriately, and a recess 220 having a curved contour may be provided instead of recess 220 having a rectangular shape as shown in FIG. 3, for example.

Recess 220 is formed to extend from the upper end of case 200 to the vicinity of the bottom surface of case 200. In other words, recess 220 is formed to extend across a whole of battery module 100, which is accommodated in case 200, in the height direction. Since recess 220 reaches the vicinity of the bottom surface of case 200, recess 220 can function as a reservoir portion or ejection path for dew condensation water in case 200. Such a function is particularly effective when water-cooling type cooling mechanism 400 is applied. Also when the forced air cooling or natural heat radiation type cooling is applied, recess 220 promotes convection in case 200, with the result that improvement in cooling efficiency can be expected.

It should be noted that recess 220 is not limited to the example in which recess 220 is formed to extend from the upper end of case 200 to the vicinity of the bottom surface of case 200, and recess 220 may be formed at a portion of case 200 in the height direction.

Each of cavities 230 is formed on a side opposite to battery module 100 (outer side of case 200) with respect to supporting portion 210. In other words, supporting portion 210 that supports battery module 100 is formed on the battery module side (inner side of case 200) with respect to cavity 230. Supporting portion 210 can be regarded as a both-ends-supported beam structure that extends from one end to the other end of cavity 230.

As shown in FIG. 4, by forming cavity 230, the thickness of supporting portion 210 is reduced, thereby facilitating deformation in the Y axis direction. Supporting portion 210 can bias battery module 100 along the Y axis direction. It should be noted that in the present disclosure, cavity 230 is not necessarily an essential element.

When battery module 100 is inserted into case 200, compression force is applied to battery module 100 along the Y axis direction. On this occasion, the whole of battery module 100 can be compressed in the Y axis direction by, for example, providing a compressible material between battery cells 110 together with the separator. When the compression force is unloaded after battery module 100 is inserted into case 200, the length of the compressed battery module 100 in the Y axis direction returns to the original length, with the result that battery module 100 presses the inner surface of case 200 in the Y axis direction. Reaction force against this pressing force serves as supporting force with which case 200 supports battery module 100.

During use of battery module 100, accommodation case 112 may be expanded due to a factor such as gasification of the electrolyte solution in accommodation case 112. Pressing force from battery module 100 to case 200 due to the expansion as well as reaction force thereagainst can also contribute to the supporting of battery module 100 by case 200.

Figure 5:
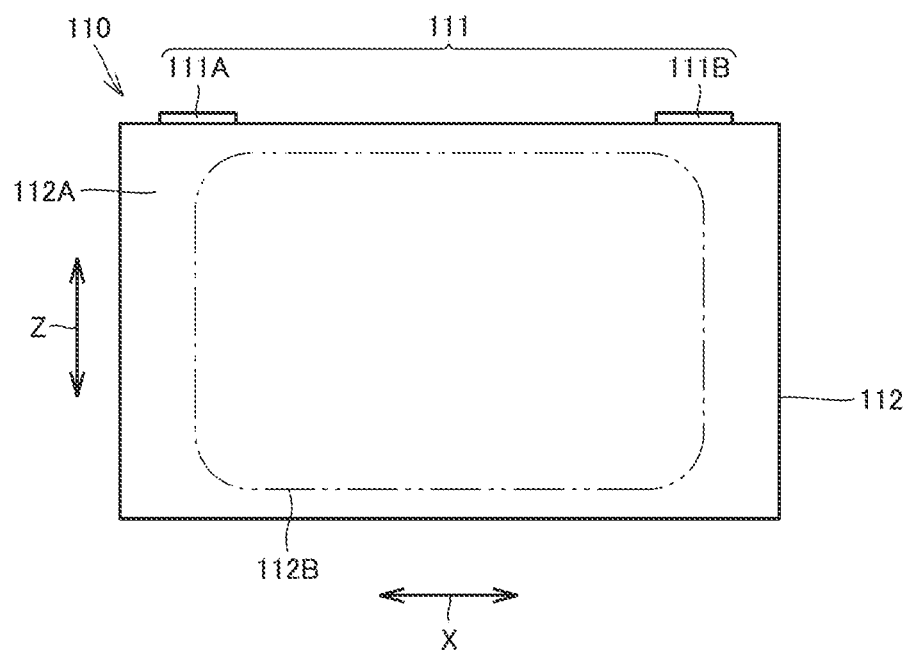
FIG. 5 is a diagram showing a restrained portion in the battery cell.

As shown in FIG. 5, a restrained portion 112B is represented as a region including a central portion of main surface 112A of battery cell 110 in the width direction (X axis direction). Restrained portion 112B is a portion restrained by receiving reaction force from supporting portion 210 of case 200 in the stacking direction (Y axis direction).

Restrained portion 112B is formed at a position separated from both ends of accommodation case 112 in a height direction (Z axis direction) of accommodation case 112. Since a joining portion (welded portion) between a main body and a sealing plate is provided on the electrode terminal 111 side of accommodation case 112, the joining portion between the main body and the sealing plate can be protected by forming supporting portion 210 and restrained portion 112B so as to avoid this position.

Figure 6:
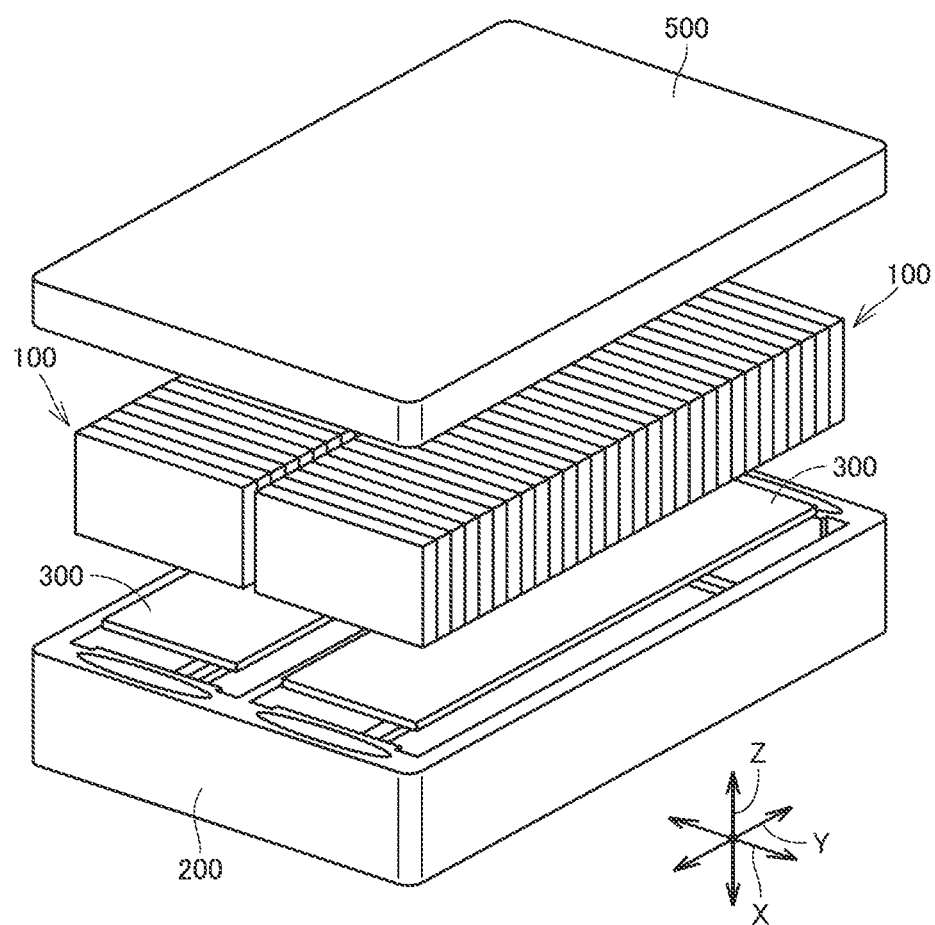
FIG. 6 is an exploded perspective view of the battery pack shown in FIG. 3.

FIG. 6 is an exploded perspective view of battery pack 1. As shown in FIG. 6, a cover member 500 is attached after battery module 100 is accommodated in case 200. Battery module 100 is accommodated in a sealed space formed by case 200 and cover member 500.

Figure 7:
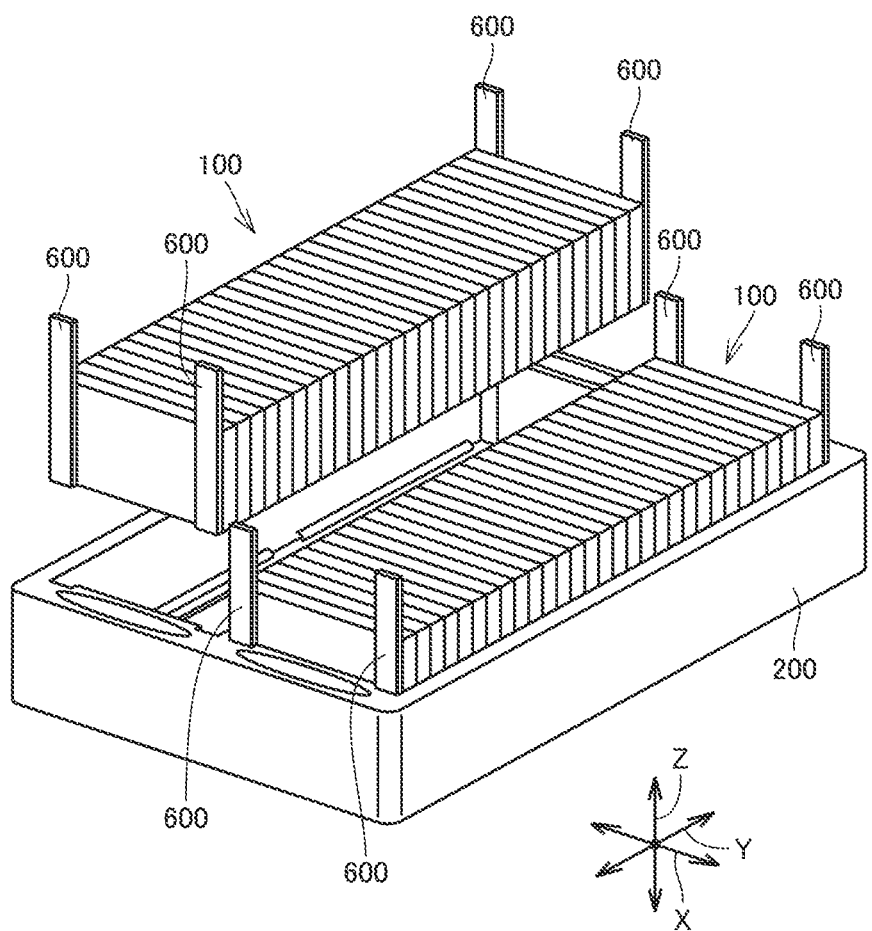
FIG. 7 is a diagram showing a state of the battery pack shown in FIG. 3 during assembly.
Figure 8:
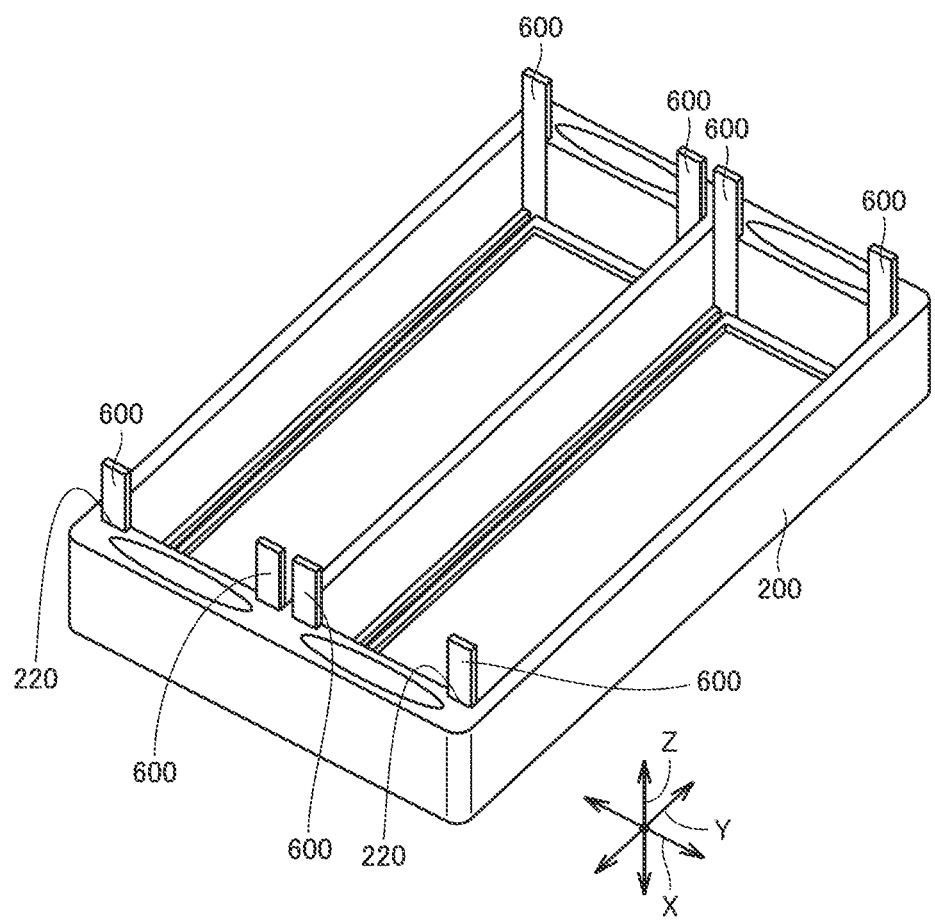
FIG. 8 is a diagram showing only the case and jigs shown in FIG. 7.

Each of FIGS. 7 and 8 shows a state of battery pack 1 during assembly. It should be noted that in FIG. 8, battery module 100 is not shown.

As shown in FIG. 7, battery module 100 formed by stacking the plurality of battery cells 110 along the Y axis direction is sandwiched in the Y axis direction using jigs 600. In this state, battery module 100 is inserted into case 200 together with jigs 600. Here, jigs 600 are inserted in recesses 220 (see FIG. 8).

After battery module 100 is inserted into case 200, compression force by jigs 600 is unloaded. Thus, battery module 100 is expanded slightly in the Y axis direction as a whole to bring battery cells 110 located at both ends in the Y axis direction into direct abutment with supporting portions 210 of case 200, thereby pressing supporting portions 210 in the Y axis direction. Due to reaction force against this pressing force, battery module 100 is restrained by supporting portions 210, with the result that battery module 100 is supported by case 200.

Figure 9:
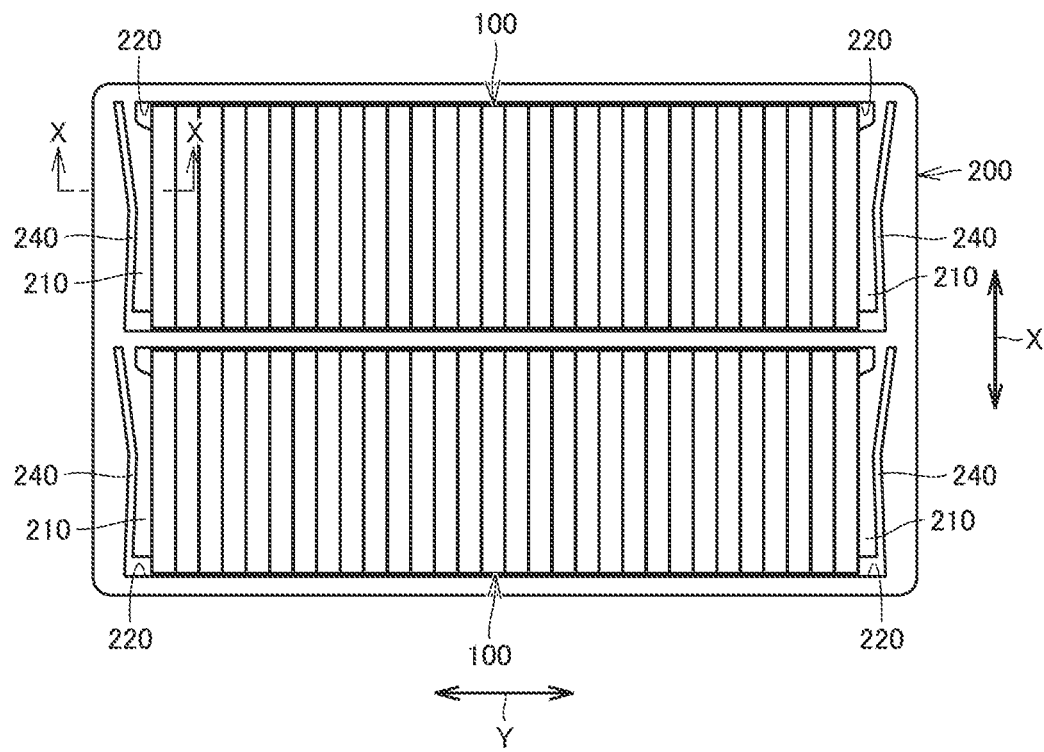
FIG. 9 is a diagram showing a modification of the structure of the case in the battery pack according to one embodiment.
Figure 10:
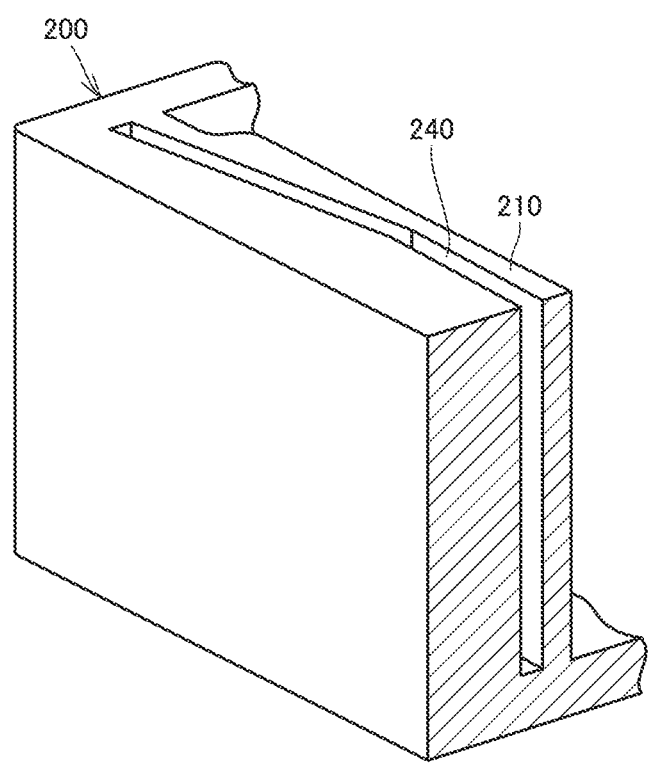
FIG. 10 is a perspective view including a cross section taken along X-X in FIG. 9.

FIG. 9 is a diagram showing a modification of the structure of case 200 in battery pack 1. FIG. 10 is a perspective view including a cross section taken along X-X in FIG. 9. It should be noted that in FIG. 10, battery module 100 is not shown.

In the modification shown in FIG. 9, case 200 is provided with groove portions 240 each on a side opposite to battery module 100 with respect to supporting portion 210. Groove portion 240 is formed to communicate with a recess 220 on one side. In other words, supporting portion 210 that supports battery module 100 is formed on the battery module 100 side (inner side of case 200) with respect to groove portion 240. Supporting portion 210 can be regarded as a cantilever beam structure extending from one end to the other end of groove portion 240.

Also with the cantilever beam structure shown in FIGS. 9 and 10, supporting portion 210 is facilitated to be deformed in the Y axis direction. Supporting portion 210 can bias battery module 100 along the Y axis direction. It should be noted that in the present disclosure, groove portion 240 is not necessarily an essential element.

According to battery pack 1 of the present embodiment, restraining force in the Y axis direction is applied to battery module 100 by the inner surface of case 200 to hold battery module 100 by case 200 without providing a restraint component such as an end plate. Therefore, reduction in weight and size of battery pack 1 can be attained while stably holding battery cell 110.

Further, since battery module 100 is directly held by case 200, heat generated in battery module 100 is facilitated to be transferred to case 200. Therefore, battery module 100 can be effectively cooled by cooling case 200 from outside.

Recess 220 formed in case 200 can be used for insertion of jig 600 thereinto when inserting battery module 100 in case 200. Further, recess 220 can perform a function as a reservoir portion or ejection path for dew condensation water in case 200 and can perform a function to promote circulation of air in case 200 in completed battery pack 1.

It should be noted that the above example has illustrated the manner of inserting battery module 100 into case 200 along the Z axis direction (manner of longitudinal insertion); however, battery module 100 may be inserted into case 200 along the X axis direction with case 200 being opened in the X axis direction (manner of lateral insertion). When the manner of lateral insertion is employed, recess 220 extending in the Z axis direction is not necessarily required.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A power storage device comprising:
a power storage module in which a plurality of power storage cells are stacked along a stacking direction; and
a case that accommodates the power storage module, wherein
each of the power storage cells in the power storage module has a main surface extending in a direction substantially orthogonal to the stacking direction, and
the case includes a supporting portion that supports, along the stacking direction, the power storage module accommodated in the case, and the case is provided with a recess that is provided at a position different from the supporting portion and that opens toward the main surface of a power storage cell at an end of the plurality of power storage cells, wherein
the supporting portion is capable of biasing the power storage module along the stacking direction, and
the case is provided with a groove portion on a side opposite to the power storage module with respect to the supporting portion, and the groove portion is formed to communicate with the recess.

2. The power storage device according to claim 1, wherein the supporting portion is in direct abutment with the main surface of the power storage cell at the end of the plurality of power storage cells.

3. The power storage device according to claim 1, wherein the supporting portion is formed at a position facing a central region of the power storage cell at the end of the plurality of power storage cells in a width direction, and the recess is formed at a position facing an end portion of the power storage cell in the width direction.

4. The power storage device according to claim 1, wherein the recess is formed to extend across a whole of the case in a height direction.

5. The power storage device according to claim 1, wherein
the power storage cell has an electrode terminal and an accommodation case, and
the supporting portion is formed at a position separated from an end portion of the accommodation case on the electrode terminal side.

6. A power storage device, comprising:
a power storage module in which a plurality of power storage cells are stacked along a stacking direction; and
a case that accommodates the power storage module, wherein
each of the power storage cells in the power storage module has a main surface extending in a direction substantially orthogonal to the stacking direction, and
the case includes a supporting portion that supports, along the stacking direction, the power storage module accommodated in the case, wherein
the supporting portion is capable of biasing the power storage module along the stacking direction,
the case is provided with a cavity on a side opposite to the power storage module with respect to the supporting portion, and
the case has two recesses disposed apart from the cavity at positions different from the supporting portion and the recesses open toward the main surface of a power storage cell at an end of the plurality of power storage cells.

7. The power storage device according to claim 1, further comprising a heat radiation promoting mechanism that promotes heat radiation from the case.

8. The power storage device according to claim 1, wherein the case is composed of a metal material or a carbon-containing material.

* * * * *